United States Patent Office 2,912,467
Patented Nov. 10, 1959

2,912,467
PHOSPHORANES AND METHOD FOR THE PREPARATION THEREOF

Max Gerecke and Gottlieb Ryser, Basel, and Paul Zeller, Neuallschwil, Switzerland, assignors to Hoffmann-La Roche Inc., Nutley, N.J., a corporation of New Jersey No Drawing. Application June 16, 1958
Serial No. 741,990

Claims priority, application Switzerland July 12, 1957

5 Claims. (Cl. 260—606.5)

This invention relates to phosphorane compounds and to a method for synthesizing such compounds. More particularly, the invention relates to triarylphosphoranes. Still more particularly the invention relates to compounds, and to a method for synthesizing such compounds, represented by the formula

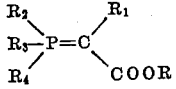

wherein
R represents alkyl,
$R_1$ represents hydrogen or alkyl,
$R_2$, $R_3$ and $R_4$ each represents phenyl, lower alkylphenyl or lower alkoxyphenyl.

The substituents represented by R are straight chain and branched chain alkyl groups such as methyl, ethyl, propyl, isopropyl, butyl, isobutyl, amyl, cetyl, hexyl, lauryl, and the like. $R_1$ represents hydrogen or an alkyl group of the class described above. R preferably represents an alkyl group of the class described above having up to about 18 carbon atoms and $R_1$ preferably represents hydrogen. $R_2$, $R_3$ and $R_4$ represent aryl groups such as phenyl, lower alkylphenyl, wherein the lower alkyl group is, for example, methyl, ethyl, propyl, isopropyl and the like and lower alkoxyphenyl, wherein the lower alkoxy group is, for example, methoxy, ethoxy, propoxy, isopropoxy and the like. Phenyl is the preferred substituent represented by $R_2$, $R_3$ and $R_4$.

A preferred group of compounds of the class described above constitutes compounds represented by Formula I when R represents an alkyl group having up to about 16 carbon atoms, $R_1$ represents hydrogen and $R_2$, $R_3$ and $R_4$ each represents phenyl.

The method for producing compounds of Formula I is also a feature of this invention. This method comprises treating with aqueous alkali a phosphonium salt having the formula

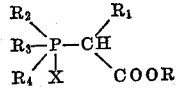

wherein R, $R_1$, $R_2$, $R_3$ and $R_4$ each have the same significance as in Formula I and X represents a halogen.

Alkalis which may be used to obtain the products of this invention include inorganic alkalis, e.g. metal hydroxides, for example, alkali metal hydroxides, such as sodium hydroxide and potassium hydroxide, alkaline earth metal hydroxides, such as calcium hydroxide.

Any halogen may be attached to the phosphorous in the position designated by X, but bromine is preferred. Approximately equivalent proportions of alkali and phosphonium salt are used. The reaction may be carried out at room temperature or slightly above.

Surprisingly, in contrast to known phosphoranes and to prior methods of synthesis, the compounds of this invention are stable in aqueous media and need not be protected against the presence of oxygen. They are obtained by the present process directly in crystalline form and may be further purified, if required, by recrystallization from common organic solvents such as ethyl acetate.

The phosphoranes of this invention are useful for reactions with aldehydes to produce olefinic compounds. For example, carbomethoxy-methylene-triphenyl-phosphorane reacts with 2,6,11,15-tetramethylhexadeca-2,4,6, 8,10,12,14-heptaen-1,16-dial to produce norbixin dimethyl ester and (α-carbocetyloxyethylidene)-triphenyl-phosphorane reacts with 4,9-dimethyldodeca-2,4,6,8,10-pentaen-1,12-dial to produce crocetin dicetyl ester.

The phosphonium salts which are used as starting materials for the process of this invention, some of which have not previously been known, are produced by heating a triarylphosphine with an α-halo-lower fatty acid alkyl ester in an organic solvent. The phosphonium salt may be isolated by evaporating the solvent or by extracting with water. If the phosphonium salt is taken up in water, the water extract may be used directly in the process of this invention.

The following examples are illustrative of the invention. All temperatures are stated in degrees centigrade.

Example 1

One hundred fifty-seven g. bromoacetic acid ethyl ester were dropped into a stirred solution of 262 g. triphenylphosphine in 1200 cc. of benzene over a period of 30 minutes. The temperature rose to 35–40° and carbethoxymethyl-triphenyl phosphonium bromide began to crystallize. The mixture was stirred overnight and filtered under suction. The crystalline material obtained was washed with benzene and petroleum ether (boiling range 40–60°), then dried under water vacuum at 50°. The carbethoxymethyl-triphenyl-phosphonium bromide melted at 158°.

One normal sodium hydroxide solution was added dropwise to a stirred solution of 42.9 g. carbethoxymethyl-triphenlyphosphonium bromide in 1000 cc. of cold water until the solution was alkaline to phenolphthalein. The precipitate was filtered off, washed with water and dried with clay. The product, carbethoxymethylene-triphenyl-phosphorane, was crystallized from hot ethyl acetate upon the addition of petroleum ether (boiling range 40–50°). The carbethoxymethylene-triphenyl-phosphorane was obtained as colorless flakes, M.P. 116–117°; U.V. maxima (in ethanol) at 222 and 268 m$\mu$ ($E_1^1$=865 and 116).

Example 2

One hundred fifty-eight g. α-bromopropionic acid methyl ester were dropped into a stirred solution of 262 g. triphenylphosphine in 1200 cc. benzene over a period of 30 minutes. There was a slight increase in the temperature of the solution. The solution was stirred for an additional two hours at 70° and the benzene was distilled off. The residue was triturated with ether, whereupon (α-carbomethoxyethyl)-triphenyl-phosphonium bromide was obtained in the form of crystals melting at 178–180°.

Forty-five g. of (α-carbomethoxyethyl)-triphenyl-phosphonium bromide were treated with dilute sodium hydroxide solution according to the procedure described in Example 1. The reaction product was recrystallized from ethyl acetate-petroleum ether. The (α-carbomethoxyethylidene)-triphenyl-phosphorane was obtained as cream colored needles, M.P. 152–153°; U.V. maxima (in ethanol) at 225 and 268 m$\mu$ ($E_1^1$=760 and 131).

Example 3

One hundred forty-four g. of methyl-(α-bromo acetate)

were dropped into a solution of 260 g. of triphenylphosphine in 1200 cc. of benzene whereby the temperature rose to 40°. After stirring at room temperature for 20 hours the precipitate was filtered off, washed with benzene and petroleum ether and dried under water vacuum at 50°. The crude carbomethoxymethyl-triphenyl-phosphonium bromide melting at 163° was pure enough for use in the next step.

One normal sodium hydroxide solution was added dropwise to a stirred solution of the crude carbomethoxymethyl-triphenyl-phosphonium bromide in 1000 cc. of cold water until the solution was alkaline to phenolphthalein. The precipitate was filtered off, washed with water and dried with clay. There were obtained thick prisms of carbomethoxymethylene-triphenyl-phosphorane from ethyl acetate upon addition of petroleum ether; M.P. 162–163°; U.V. maxima (in ethanol) at 222 and 268 m$\mu$; $E_1^1$=908 and 125.

*Example 4*

Three hundred forty g. bromoacetic acid cetyl ester were dropped into a stirred solution of 260 g. triphenylphosphine in 1200 cc. of benzene over a period of 30 minutes. The temperature rose to 35–40° and carbocetyloxymethyl-triphenyl-phosphonium bromide began to crystallize. The mixture was stirred over night and filtered under suction. The crystalline material obtained was washed with benzene and petroleum ether [boiling range 40–60°] and then dried under water vacuum at 50°. The crystals obtained melted at 223–224°.

The carbocetyloxymethyl-triphenyl-phosphonium bromide was dissolved in 1000 cc. of cold water and 1N sodium hydroxide solution was added dropwise until the solution was alkaline to phenolphthalein. The precipitate was filtered off, washed with water and dried with clay. The product carbocetyloxymethylene-triphenyl-phosphorane was crystallized from hot ethyl acetate upon the addition of petroleum ether (boiling range 40–50°). The carbocetyloxymethlyene-triphenyl-phosphorane was obtained as colorless crystals of melting point 90–91°; U.V. maxima (in ethanol) at 222 and 268 m$\mu$; $E_1^1$=450 and 60.

*Example 5*

One hundred sixty-two g. $\alpha$-bromopropionic acid ethyl ester were dropped into a stirred solution of 262 g. triphenylphosphine in 1200 cc. of benzene over a period of 30 minutes. There was a slight increase in the temperature of the solution. The solution was stirred for an additional two hours at 70° and the benzene was distilled off. The residue was triturated with ether, whereupon ($\alpha$-carbethoxyethyl)-triphenyl-phosphonium bromide was obtained in the form of crystals melting at 199–200°.

Forty g. of ($\alpha$-carbethoxyethyl)-triphenyl-phosphonium bromide were treated with dilute sodium hydroxide solution according to the procedure described in Example 1. The reaction product was recrystallized from ethyl acetate-petroleum ether. The ($\alpha$-carbethoxyethylidene)-triphenyl-phosphorane was obtained as colorless prisms melting at 156–157°; U.V. maxima (in ethanol) at 225 and 268 m$\mu$; $E_1^1$=743 and 138.

*Example 6*

Three hundred forty-two g. of $\alpha$-bromopropionic acid cetyl ester were dropped into a stirred solution of 262 g. triphenylphosphine in 1200 cc. of benzene over a period of 30 minutes. There was a slight increase in the temperature of the solution. The solution was stirred for an additional two hours at 70° and the benzene was distilled off. The residue was triturated with ether, whereupon ($\alpha$-carbocetyloxyethyl)-triphenyl-phosphonium bromide of M.P. 203° was obtained.

Sixty-five g. of ($\alpha$-carbocetyloxyethyl)-triphenyl-phosphonium bromide were treated with dilute sodium hydroxide solution according to the procedure described in Example 1. The reaction product was recrystallized from ethyl acetate upon addition of petroleum ether. The ($\alpha$-carbocetyloxyethylidene)-triphenyl-phosphorane was obtained as crystals melting at 68–69°; U.V. maxima (in ethanol) at 225 and 268 m$\mu$; $E_1^1$=482 and 56.

We claim:

1. A method for the production of a compound represented by the formula

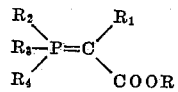

wherein

R represents alkyl, $R_1$ represents a member of the group consisting of hydrogen and alkyl, and $R_2$, $R_3$ and $R_4$ each represents a member of the group consisting of phenyl, lower alkylphenyl and lower alkoxyphenyl, which comprises treating with approximately an equivalent proportion of aqueous alkali a compound represented by the formula

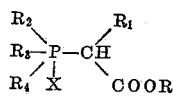

wherein R, $R_1$, $R_2$, $R_3$ and $R_4$ each have the same significance as above and X represents halogen.

2. A method for the production of a compound represented by the formula

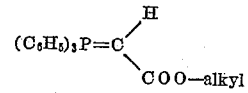

which comprises treating with approximately an equivalent proportion of aqueous alkali a compound represented by the formula

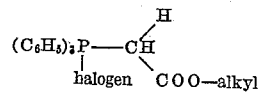

3. A process as in claim 2 wherein the alkali is alkali metal hydroxide.

4. A process for the production of carbethoxymethylene-triphenyl-phosphorane which comprises treating carbethoxymethyl-triphenyl-phosphonium bromide with approximately an equivalent proportion of aqueous sodium hydroxide.

5. A process for the production of ($\alpha$-carbomethoxyethylidene)-triphenyl-phosphorane which comprises treating ($\alpha$-carbomethoxyethyl)triphenyl-phosphonium bromide with approximately an equivalent proportion of aqueous sodium hydroxide.

References Cited in the file of this patent

Wittig et al.: "Chem. Berichte," vol. 88, pp. 1654 to 1666 (1925), abstracted in Chemical Abstracts, vol. 50, pp. 10030–1 (1956).